United States Patent [19]

Irvin

[11] Patent Number: 4,562,402
[45] Date of Patent: Dec. 31, 1985

[54] METHOD AND APPARATUS FOR GENERATING PHASE LOCKED DIGITAL CLOCK SIGNALS

[75] Inventor: Darrell B. Irvin, Tualatin, Oreg.

[73] Assignee: Tektronix, Inc., Beaverton, Oreg.

[21] Appl. No.: 489,978

[22] Filed: Apr. 29, 1983

[51] Int. Cl.⁴ ............... H03K 1/17; H03K 5/13; H03K 21/36

[52] U.S. Cl. ................... 328/63; 307/262; 307/269; 328/155; 377/108

[58] Field of Search ............... 307/262, 269; 328/55, 328/62, 63, 72, 109, 155; 377/108, 115, 116

[56] References Cited

U.S. PATENT DOCUMENTS 4,423,383  12/1983  Svendsen ................ 328/63

Primary Examiner—Stanley D. Miller
Assistant Examiner—B. P. Davis
Attorney, Agent, or Firm—Francis I. Gray; George T. Noe

[57] ABSTRACT

A method and apparatus for generating two phase locked digital clocks of different word rates particularly suited for a graphic and alphanumeric computer display terminal. Master and slave clock generators are used to generate output pulses at every N-th and M-th clocks of a common clock. A phase lock loop including the master clock generator and a phase lock counter dividing the common clock by the factor of the least common multiple of N and M is used to synchronize the slave clock generator.

6 Claims, 4 Drawing Figures

METHOD AND APPARATUS FOR GENERATING PHASE LOCKED DIGITAL CLOCK SIGNALS

BACKGROUND OF THE INVENTION

This invention relates to a method and apparatus for generating two clock signals phase locked to a common system clock but having different word rates.

Computers of various sizes are readily available at reasonable prices as a result of technological advances in micro electronics, i.e., integrated circuits. Computing power of digital computers has intensively been utilized for handling both graphical and alphanumerical information. To enhance human/computer interface, computer display terminals, including those employing high resolution color CRTs (cathode-ray tubes), as well as other types, become increasingly important in both office and laboratory environments.

It is preferable that such computer display terminals have the capability to display both graphic and alphanumerical information either on the entire CRT screen or selected areas thereof, with a selectable relationship therebetween, which may include a superimposed display of alphanumerics over a background graphic display, or vice versa. A raster scan type computer terminal display system architecture which utilizes separate subsystems for graphic and alphanumerics (text or dialog) requires two different timing generators operating from a common pixel rate system clock, but generating word rate clocks of different lengths. In this application, the two clocks not only have to have a fixed phase with each other but also a fixed phase with the horizontal period of the master CRT controller so that the alphanumerics display will operate correctly. In prior art systems, separate clock generators are dependent upon one another, resulting in difficult synchronizing problems. Moreover, in such prior art systems, the clock generators were synchronized once at initialization, offering no immunity from noise which might advance one clock generator, but not the other.

SUMMARY OF THE INVENTION

In accordance with the present invention, two clock generators A and B are used to generate the desired word rate clock pulses at every N-th and M-th clock pulses, respectively, of a common clock, and a $\div L$ phase lock counter, where L is equal to the least common multiplier (LCM) of the two clock signals to be generated by the clock generators A and B. The clock generator A and its associated circuit provides the master reference of the system to which the clock generator B is phase locked. The phase lock counter provides a single-pixel clock-wide reset pulse to the clock generator B, forcing clock generator B to maintain a fixed phase relationship with the phase lock counter. As long as the input to the phase lock counter from the associated circuit occurs at the correct time, the phase lock counter ignores the input. Otherwise if the timing is not correct, the phase lock counter ignores one input clock pulse of each 48-pulse cycle, thereby effectively moving the phase of the phase lock counter one clock cycle back in time. This operation is repeated once per active edge of the input signal until the phase is locked.

It is therefore a primary object to provide a method and apparatus for generating phase locked digital clock signals particularly suited to a graphic and alphanumeric computer display terminal.

It is another object of this invention to provide a clock generator including two separate clock generators each essentially independent of the other allowing easy modification of the clock generators during system development.

It is still another object of this invention to provide a clock generator using a third clock generator to phase lock two separate clock generators together, thereby allowing easy adjustment of the relative phase of the two clock generators.

It is yet another object of this invention to provide a clock generator generating two clocks in phase at all times rather than syncing them once at system initialization.

It is a further object of this invention to provide a method and apparatus for gently phase locking master and slave clock generators without generating short clock cycles in the slave clock generator.

The foregoing and numerous other objects, advantages, and inherent functions of the present invention will become apparent to those having ordinary skill in the art upon a reading of the following description when taken in conjunction with the accompanying drawings. It is to be understood, however, that the embodiment described is not intended to be exhausting nor limiting of the invention and is presented as an example only.

DETAILED DESCRIPTION OF THE PREFERRED EMBODIMENT

Figure 1:
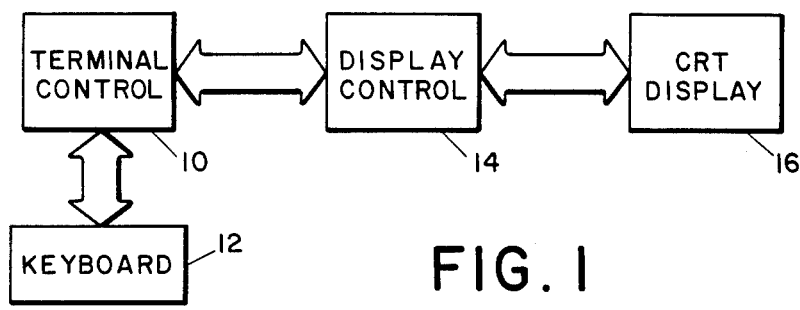
FIG. 1 is a block diagram of a computer terminal employing phase locked digital clocks according to this invention.

Referring now to the drawings, FIG. 1 is a simplified overall block diagram of the computer display terminal to which the present invention is applied. The system comprises terminal control 10, keyboard 12, display control 14, and CRT display 16.

Terminal control 10 preferably comprises a microprocessor (e.g. Intel 80186), a RAM (random access memory), a ROM (read only memory), and interface circuits for keyboard 12 and a copier/printer. These devices are all connected to address, processor data and system data buses. Keyboard 12 may be connected to the terminal interface via, for example, an RS-232C serial communication cable and may be any conventional design (e.g. Intel 8048) including alphanumeric keys like a normal typewriter in addition to a joy stick or a joy disk for generating instructions to the microprocessor, and also for cursor position control and scrolling in graphic display mode.

Figure 2:
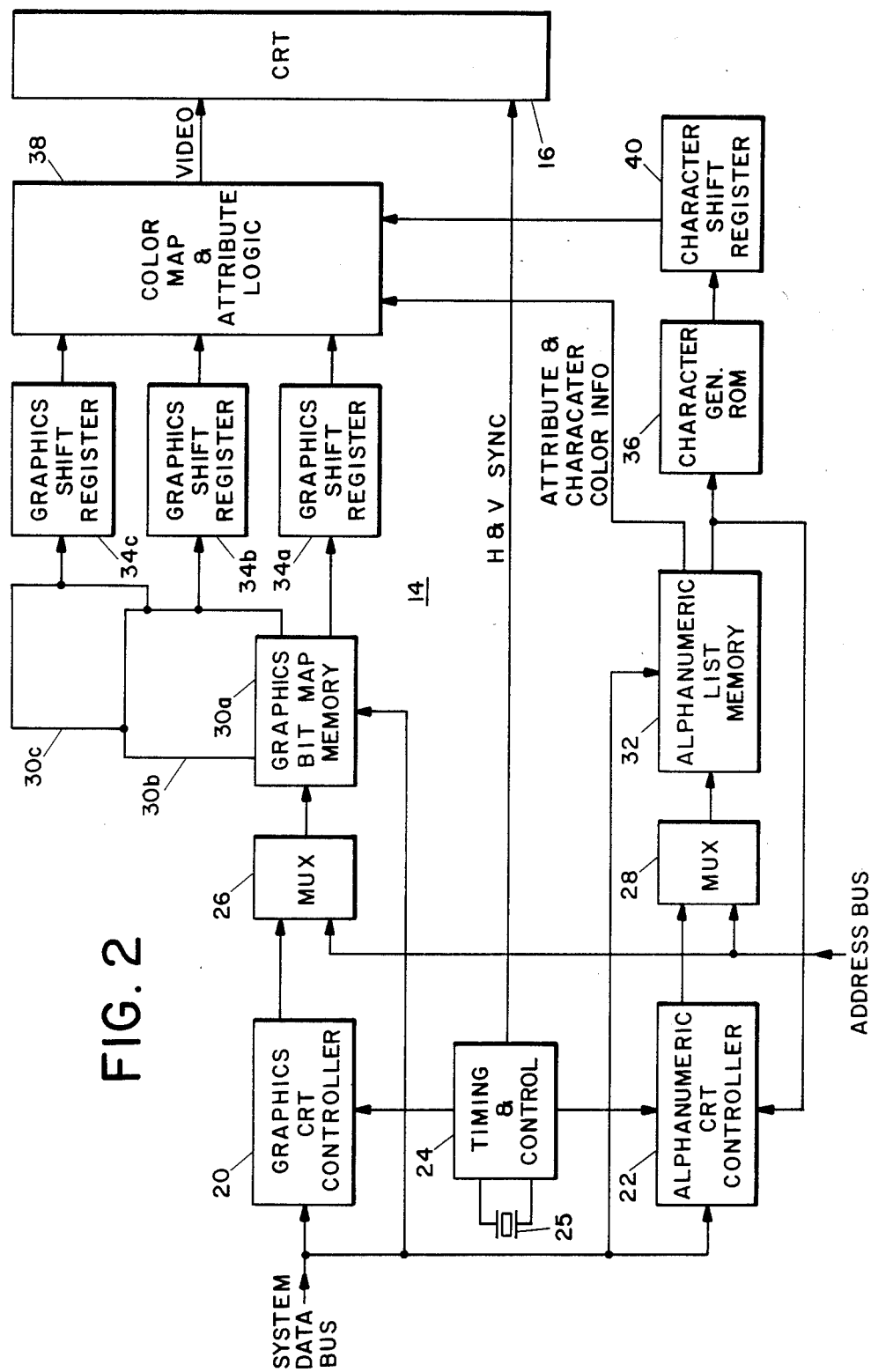
FIG. 2 is a more detailed block diagram of one important portion of FIG. 1.

The address information and data from terminal control 10 are applied to display control 14 for displaying the graphic and/or alphanumeric information on CRT display 16 with selected color and attribute. Shown in FIG. 2 is a more detailed block diagram of display control 14.

Data put on the system data bus by the microprocessor in terminal control 10 is fed either to the graphics bit map memory 30 or the alphanumeric list memory 32 depending on the data contents. The accompanying address from the terminal control 10 is applied to either the graphics bit map memory 30 or the alphanumeric list memory 32 through their respective multiplexors (MUXs) 26 and 28 thereby accomplishing the storage of the data in the correct memory. Alternately, the MUXs may supply the graphics bit map memory 30 with an address from the graphics CRT controller 20 of the alphanumeric list memory 32 with an address from its associated alphanumeric CRT controller 22. Graphic bit map memory 30 preferably comprises three bit map planes (30a, 30b and 30c) whose output form a three bit number which may select one of eight different color mixtures for display on the CRT display 16. Graphics bit map memory 30 may be a 512 pixel × 512 pixel graphics bit map, of which a region of 480 pixel × 360 pixel is displayed on the CRT screen.

The read-out graphics data from graphics bit map memory 30 is then applied to color map and attribute logic 38 by way of respective graphics shift registers 34a, 34b and 34c before being applied to CRT display 16 as a video signal. The read operations are performed in groups of 16 in the graphic display mode. Similarly, alphanumeric list memory 32 is read out and used to supply color and attribute information to the color map and attribute logic 38 and to drive character generator ROM 36 in accordance with the stored contents of alphanumeric list memory 32. The output from character generator ROM 36 is fed to color map and attribute logic 38 by way of character shift register 40 causing selection of the correct color and attribute, thereby displaying a character at the selected area of the CRT screen. In an alphanumeric display (dialog) mode, the character format suitably may be 80 columns, 30 rows, 5×9 character matrix in a 6×12 cell, with eight different colors independent of graphic colors. Character matrix (5×9) may be selected to any desired area within the 6×12 cell. Alphanumeric list memory 32 also includes attrubute data, for example, to cause blinking of or underlining the characters.

Graphic CRT controller 20 and alphanumeric CRT controller 22 must be controlled in synchronism with each other and by word rate clock signals of different lengths as described hereinafter by reference to FIGS. 3 and 4. Timing and control circuit 24 including quartz oscillator 25 (shown in FIG. 2) generates the required two clock signals. Quartz oscillator 25 may operate to provide a master pixel clock rate, for example, 14.7456 MHz in this particular example.

Figure 3:
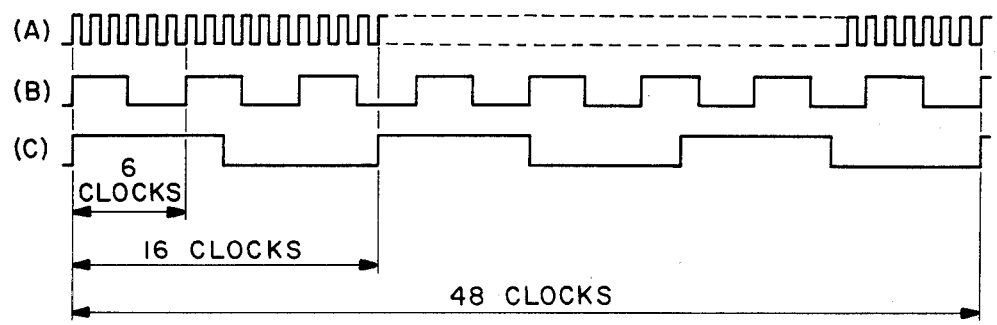
FIG. 3 is a timing diagram to explain the time relationship of phase locked digital clock signals according to this invention.

The required phase locked digital clock signals are shown in FIG. 3. Waveform (A) is the master pixel clock signal. Waveform (B) is the alphanumeric word rate clock signal which is one sixth of the master pixel clock rate (A). Waveform (C) is the graphic word rate clock signal which is one sixteenth of the master pixel clock rate (A). The graphic and alphanumeric word rate clock signals (C) and (B) are applied to graphic and alphanumeric CRT controllers (20) and (22), respectively. It is, of course, understood that the word rates of the two clocks (B) and (C) differ with respect to the common pixel rate system clock depending on the size of character display cell and the way of access to graphics bit map memory 30. In this particular application, the two clocks not only had to be in phase with each other but also in phase with the horizontal period of graphics CRT controller 20 so that the alphanumeric display would operate correctly. It should be noted that the clock edges of the two clock signals come into phase with each other only once every 48 master pixel clock pulses. This number 48 is the least common multiple (LCM) of the two clock signals to be generated.

Figure 4:
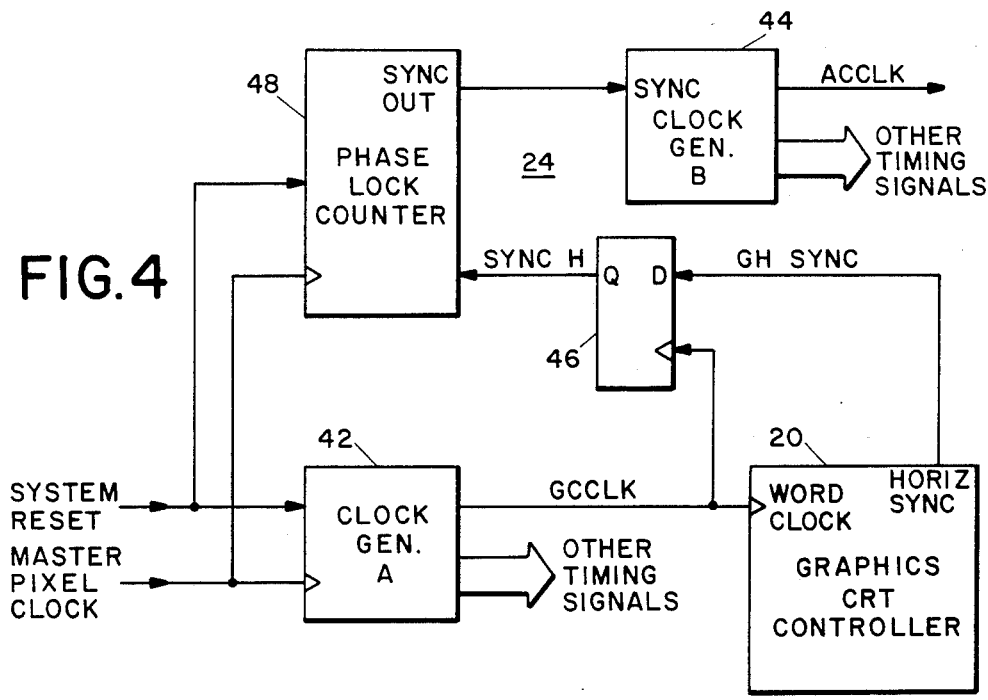
FIG. 4 is a block diagram of one preferred embodiment of the phase locked digital clock generator according to this invention.

Now, shown in FIG. 4 is a simplified block diagram of one preferred phase locked digital clock generator according to this invention. The phase locked digital clock generator comprises clock generator A (master clock generator) 42, clock generator B (slave clock generator) 44, phase lock counter 48 and delay flip-flop 46. Clock generator A 42 receives the master pixel clock (waveform A in FIG. 3) and a system reset pulse to the clock and reset terminals, respectively. Clock generator A 42 may be a frequency divider including four flip-flop stages to provide its output (GCCLK) and other timing signals. The GCCLK (waveform C in FIG. 3) is one sixteenth (÷16) of the master pixel clock and is applied to the word clock terminal of graphics CRT controller 20. The horizontal sync pulse (GH SYNC) from graphics CRT controller 20 and the GCCLK are applied to the D and clock input terminals of delay flip-flop 46, respectively. A Q output (SYNC) fron H delay flip-flop is applied to the input terminal of phase lock counter 48 which receives the master pixel clock signal and system reset pulse to the clock and reset terninals, respectively. A SYNC pulse of a single pixel wide pulse from phase lock counter 48 is applied to the SYNC input terminal of clock generator B 44 to synchronously reset the same, thereby operating clock generator B 44 to provide the output clock pulse ACCLK (waveform B in FIG. 3) at one sixth of the master pixel clock in a fixed phase relationship to phase lock counter 48.

In operation, both clock generator A 42 and phase lock counter 48 are first initialized on receiving the system reset pulse or upon power up of the entire system. Clock generator A 42 generates the GCCLK at every one sixteenth (÷16) of the master pixel clock while phase lock counter 48 counts down the master pixel clock to one forty-eighth (48). The GCCLK from clock generator A 42 is applied to the word clock terminal of graphics CRT controller 20, which suitably may be a Synertek 6545 CRT controller including a sync signal generator or timing and control circuitry. The horizontal sync signal (GHSYNC) from graphics CRT controller 20 is delayed and cleaned up by delay flip-flop 46 to provide its output signal (SYNC H). Delay flip-flop 46 is shown as a conventional D-type flip-flop, wherein the D input level is transferred to the Q output terminal at the leading edge of the clock pulse. Any subsequent change of the D input following the leading edge of the clock pulse has no effect upon the flip-flop output.

Phase lock counter 48 divides the master pixel clock by the LCM (48) of the two output clocks from clock generators A and B as mentioned earlier. This counter 48 also decodes and outputs a single pixel clock wide pulse (SYNC) which serves to synchronously reset clock generator B 44 to one particular state. Phase lock counter 48 is sensitive to only the leading edge of the SYNC H signal. There is one state of phase lock counter 48 out of its 48 states in which it is not sensitive to the SYNC H input signal. If the leading edge of the SYNC H signal occurs in one of the 47 sensitive states of phase lock counter 48, it stays in that state for one extra pixel clock cycle, thereby effectively moving the phase of phase lock counter one pixel clock back in time. This causes the SYNC output of phase lock counter 48 to occur one clock later, forcing clock generator B 44 to also move back one pixel clock in phase due to the synchronous reset function caused by the SYNC output of phase lock counter 44.

The aforementioned procedure is repeated with phase lock counter 48 and clock generator B slipping one master pixel clock cycle per horizontal sync from graphics CRT controller until such time as the leading edge of the SYNC H signal reaches phase lock counter 48 during the only one non-sensitive state to this input. In this state, phase lock counter 48 ignores the SYNC H input and proceeds to its next state. The circuit is now locked and the two word rate clocks which may be used for alphanumeric and graphic displays are in phase with each other and also with the horizontal period of the master CRT controller.

It should be noted that the relative phase of the two clock generators A and B may be adjusted without affecting the phase lock action or the design of either clock generator by merely changing which state the phase lock counter outputs its SYNC signal. The continuous nature of the system acts to keep the clocks in phase at all times as opposed to syncing the clock generators once at system initialization, which will offer no immunity from noise that might advance one generator, but not the other. The method of phase locking the clock generator B (slave) to the master clock generator A is gentle in that when not in locked condition, the slave's output clock is lengthened by only one master clock cycle each sync time until the clocks are in phase with each other. This does not violate any clock frequency specifications on logic circuits driven by the slave clock generator.

From the foregoing, it will be seen that the applicant has provided a new and novel method and apparatus for generating two phase locked clocks of different word rate. The clock generator A may be preferably utilized to drive a graphics CRT controller to generate graphic information to be displayed on the CRT screen while the clock generator B may be utilized to drive an alphanumeric memory to display alphanumerics on the CRT screen. Since the clock generator B is also synchronized with the horizontal sync pulse (GHSYNC) from the graphics CRT controller, the alphanumeric data can be overlayed with the graphic data, i.e., the alphanumeric data can be displayed on the CRT screen while displaying the graphic data on the background. However, it may be observed that the foregoing specification has not been burdened by the inclusion of large amounts of detail since they are believed to be within the skill of the art. It should be noted that the particular embodiment of the invention which is shown and described herein is intended to be illustrative and not restrictive of the invention. Therefore, the appended claims are intended to cover all modifications which fall within the scope of the foregoing specification.

I claim as my invention:

1. A clock generator for generating two phase locked digital clocks, comprising:
   a first clock generator to generate a first word rate clock equal in frequency to one N-th of a common clock applied thereto;
   a second clock generator to generate a second word rate clock equal in frequency to one M-th of the common clock; and
   a phase lock counter to divide the frequency of the common clock by the least common multiple of the numbers N and M, said phase lock counter receiving an input sync pulse related to said first word rate clock and providing a sync output to said second clock generator to provide gentle phase locking with said first clock generator.

2. A clock generator of claim 1, wherein the common clock comprises a master pixel clock, and said first and second word rate clocks are applied to graphics and alphanumeric CRT controllers, respectively, said graphics CRT controller providing a horizontal sync pulse for combination with said first word rate clock to produce said input sync pulse.

3. A clock generator of claim 2, further comprising a delay flip-flop to receive respectively said first word rate clock and said horizontal sync pulse at the clock and D inputs and to output said input sync pulse to said phase lock counter.

4. A clock generator of claim 2, wherein the numbers N and M are selected to be 16 and 6, respectively.

5. A method of generating two phase locked digital clocks, comprising the steps of:
   generating a first word rate clock having a frequency equal to one N-th of a common clock;
   generating a second word rate clock having a frequency equal to one M-th of the common clock;
   dividing the common clock by the factor of the least common multiple of the numbers N and M to provide a divided output signal;
   syncing said second word rate clock with the divided output signal; and
   delaying said divided output signal by one common clock pulse until the leading edge of said first word rate clock coincides with the leading edge of said second word rate clock.

6. A clock generator of claim 1, wherein said phase lock counter comprises an apparatus having a plurality of states, all of said states except one being sensitive to the leading edge of said input sync pulse such that said input sync pulse causes said sync output to be delayed by one pulse width of the common clock each time one of said sensitive states is pulsed, but not when said one non-sensitive state is pulsed.

* * * * *